(12) United States Patent
Hall et al.

(10) Patent No.: US 7,467,937 B1
(45) Date of Patent: Dec. 23, 2008

(54) PRELOADED THREADS FOR A HIGH-TEMPERATURE HIGH-PRESSURE PRESS

(76) Inventors: David R. Hall, 2185 S. Larsen Pkwy., Provo, UT (US) 84606; Ronald Crockett, 2185 S. Larsen Pkwy., Provo, UT (US) 84606; Timothy C. Duke, 2185 S. Larsen Pkwy., Provo, UT (US) 84606; Scott Dahlgren, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/947,678

(22) Filed: Nov. 29, 2007

(51) Int. Cl.
*B29C 43/04* (2006.01)
*B29C 43/32* (2006.01)

(52) U.S. Cl. .......................... 425/77; 425/193; 425/330; 425/DIG. 26; 419/48; 419/51; 419/68

(58) Field of Classification Search ............... 425/77, 425/193, 195, 330, 405.1, 405.2, DIG. 26; 419/48, 49, 51, 54, 55, 68
See application file for complete search history.

(56) References Cited

U.S. PATENT DOCUMENTS

| | | |
|---|---|---|
| 2,918,699 A | 12/1959 | Hall |
| 2,968,837 A | 1/1961 | Zeitlin |
| 3,093,862 A | 6/1963 | Gerard |
| 3,159,876 A | 12/1964 | Hall |
| 3,182,353 A | 5/1965 | Hall |
| 3,255,490 A | 6/1966 | Sturm |
| 3,257,688 A | 6/1966 | Levey |
| 3,914,078 A * | 10/1975 | Kendall ................ 425/77 |
| 5,744,170 A | 4/1998 | Hall |
| 5,780,139 A | 7/1998 | Carter |
| 5,851,568 A | 12/1998 | Huang |
| 6,022,206 A | 2/2000 | McNutt |
| 6,186,763 B1 * | 2/2001 | Scanlan ................ 425/195 |
| 6,336,802 B1 | 1/2002 | Hall |
| 7,354,262 B2 * | 4/2008 | Hall et al. ............. 425/77 |
| 2007/0009626 A1 | 1/2007 | Hall |

* cited by examiner

*Primary Examiner*—Yogendra Gupta
*Assistant Examiner*—Thu Khanh T Nguyen
(74) *Attorney, Agent, or Firm*—Tyson J. Wilde

(57) ABSTRACT

In one aspect of the present invention, a high-temperature, high-pressure press apparatus has a cartridge assembly adapted for connection to a unitary frame. An anvil is attached at a front end of a cylindrical body of the cartridge and a hydraulic chamber within the body is adapted to apply axial pressure to the anvil. A threaded end of the anvil is adapted for mating with a threaded inside diameter of a borehole disposed within a wall of the frame. A radial compression element disposed around an outer diameter of the body is adapted to limit radial expansion of the body proximate the hydraulic chamber. At least one mechanism is attached to the radial compression element; the at least one mechanism being adapted to preload the threaded connection between the cartridge assembly and the frame.

18 Claims, 8 Drawing Sheets

900

```
┌─────────────────────────────────────────────────────┐
│ Providing a cartridge adapted for connection to a   │
│ frame of a high temperature, high pressure press    │
│ with an anvil at a front end of a cylindrical body  │
│ of the cartridge and a hydraulic chamber within the │
│ body adapted to apply axial pressure to the anvil   │
│                                                 901 │
└─────────────────────────────────────────────────────┘
```

Providing a cartridge adapted for connection to a frame of a high temperature, high pressure press with an anvil at a front end of a cylindrical body of the cartridge and a hydraulic chamber within the body adapted to apply axial pressure to the anvil
901

Securing at least one mechanism to a radial compression element disposed around an outer diameter of the body of the cartridge
902

Mating a threaded portion of the anvil with a threaded inside diameter of a borehole disposed in a wall of the frame
903

Adjusting the at least one mechanism and thereby preloading the threaded connection between the cartridge assembly and the frame
904

Fig. 9

PRELOADED THREADS FOR A HIGH-TEMPERATURE HIGH-PRESSURE PRESS

BACKGROUND OF THE INVENTION

The present invention relates to high-temperature, high-pressure (HTHP) press apparatuses that are used for a variety of purposes including the production of superhard materials such as synthetic diamond, cubic boron nitride, or diamond-like materials. Typically, the manufacturing or sintering process for superhard materials in a HTHP multi-axis press comprise of placing a payload inside a HTHP reaction cell. The reaction cell, made up of a pressure-transferring medium, is placed within the press's high-pressure chamber and subjected to an ultra-high compressive force. During the press cycle, the pressure inside the cell must reach at least 35 kilobars. Simultaneously, an electrical current is passed through the cell's resistance heating mechanism raising the temperature inside the cell to above 1000 degrees Celsius. Once the superhard payload is subjected to sufficient pressure and temperature for a prescribed period of time, the current is terminated and the cell cooled. Pressure on the cell is then released, the anvils retracted, and the cell with its super hard payload removed from the press.

U.S. Pat. No. 6,336,802 to Hall, which is herein incorporated by reference for all that it contains, discloses a reduced mass unitary frame having a cubic, spherical, prismatic, or ellipsoidal shape, a plurality of intersecting threaded boreholes that describe a spherical internal reaction chamber, and a plurality of unitary cartridges with internal fluid intensification for an ultra-high pressure, high temperature, fluid driven press apparatus capable of reaching pressures in excess of 35 kilobars and temperatures above 1000 degrees centigrade, useful in the production of such high-pressure products as diamond, polycrystalline diamond, cubic boron nitride, and like superhard materials.

U.S. Pat. No. 7,186,104 to Hall, et al., which is herein incorporated by reference for all that it contains, discloses a hydraulic cartridge and unitary frame connection for a high pressure high temperature press apparatus. The invention includes a hydraulic cartridge and a unitary frame threaded together. The hydraulic cartridge includes a cylindrical base and a truncated hollow conical section with external threads having a taper between about 2.650 and 5.650 inches per foot. The unitary frame defines an inner reaction chamber and has an outer surface. An opening in the unitary frame has internal threads extending axially substantially between the outer surface and the inner reaction chamber. The internal threads are adapted to mate with the hydraulic cartridge and the hydraulic cartridge is attached to the unitary frame along the length of the threads.

BRIEF SUMMARY OF THE INVENTION

In one aspect of the present invention, a high-temperature, high-pressure press apparatus has a cartridge assembly adapted for connection to a unitary frame. An anvil is attached at a front end of a cylindrical body of the cartridge and a hydraulic chamber within the body is adapted to apply axial pressure to the anvil. A threaded end of the anvil is adapted for mating with a threaded inside diameter of a borehole disposed within a wall of the frame. A radial compression element disposed around an outer diameter of the body is adapted to limit radial expansion of the body proximate the hydraulic chamber. At least one mechanism is attached to the radial compression element; the at least one mechanism being adapted to preload the threaded connection between the cartridge assembly and the frame.

The cartridge assembly may have a sensor adapted to control a working portion of the at least one mechanism. The working portion may be hydraulically controlled or may comprise an adjustable thread adapted to control the mechanism. A bronze wafer may be disposed intermediate the at least one mechanism and the frame of the press, the bronze wafer being adapted to protect the surface of the frame. The unitary frame may comprise materials selected from the group consisting of high-strength steel, polymer fibers, graphite fiber composites, or a combination thereof. The unitary frame may also comprise a cubic, prismatic, spherical, or ellipsoidal shape.

The radial compression element may be a solid annular ring and may have a varying thickness in an axial direction. The radial compression element may have an axial length from 4 to 16 inches. At least one notch may be disposed about the radial compression element, the notch being adapted for securing the at least one mechanism to the radial compression element. The at least one mechanism may be in communication with an undercut portion of the anvil.

In another aspect of the present invention, a method provides steps for preloading a thread used in high-temperature, high-pressure processing. The steps include securing at least one mechanism to the radial compression element, mating the threaded portion of the anvil with a threaded inside diameter of the borehole disposed in the wall of the frame, and adjusting the at least one mechanism, thereby preloading the threaded connection between the cartridge assembly and the frame. The at least one mechanism may be adjusted hydraulically or by controlling an inner threaded working portion.

In another aspect of the invention, the at least one mechanism is in communication with the press apparatus, the at least one mechanism being adapted to preload the threaded connection between the cartridge assembly and the frame. In some embodiments, the at least one mechanism may have a threaded nut in communication with the press apparatus. In other embodiments, the at least one mechanism may have a hydraulic working portion.

BRIEF DESCRIPTION OF THE DRAWINGS

FIG. 9 is a diagram of an embodiment of a method for preloading a thread used in high-temperature, high-pressure processing.

DETAILED DESCRIPTION OF THE INVENTION AND THE PREFERRED EMBODIMENT

Figure 1:
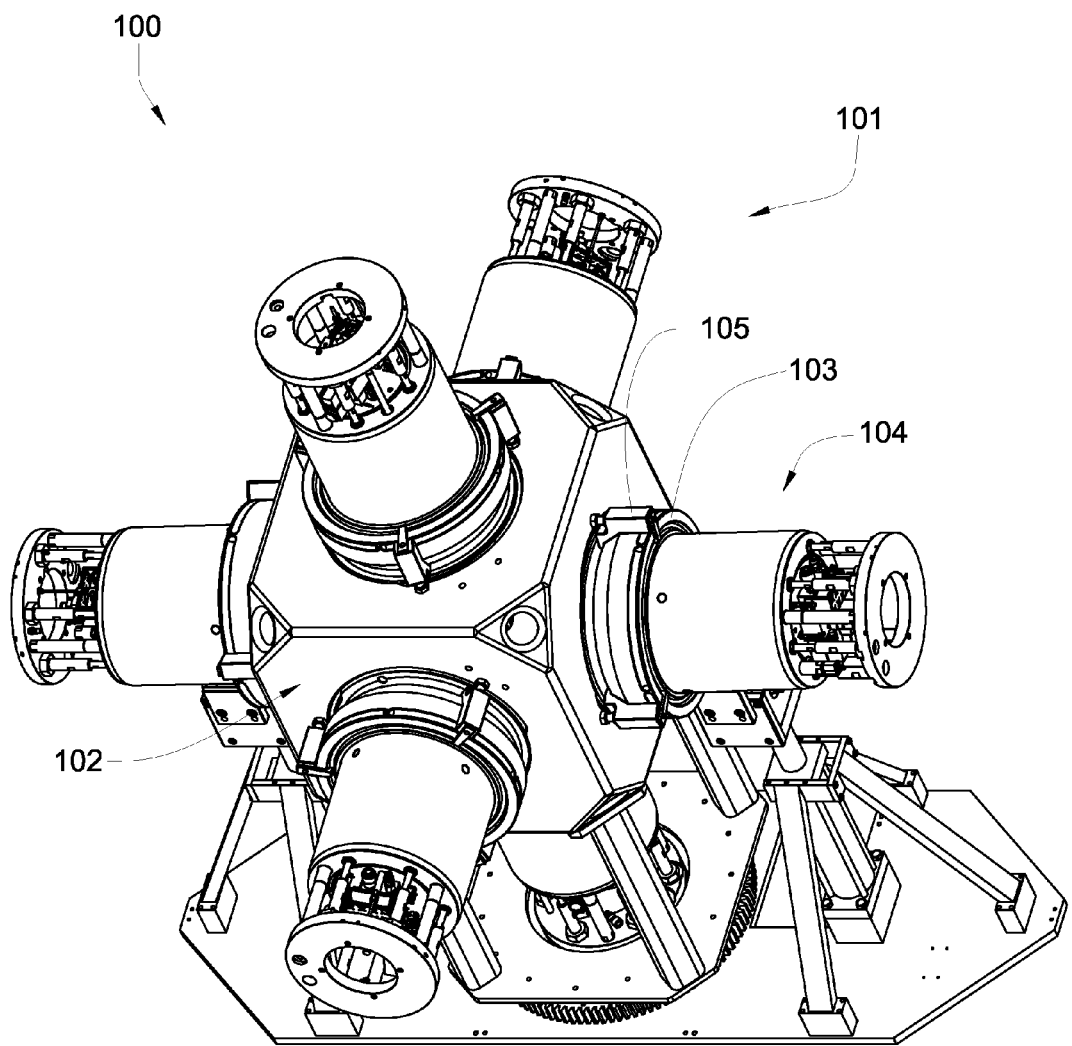
FIG. 1 is a perspective diagram of an embodiment of a high-temperature, high-pressure press.

FIG. 1 illustrates a preferred embodiment of a high-temperature, high-pressure (HTHP) press 100 having six cartridge assemblies 101 that have a threaded connection with a unitary press frame 102. The cartridge assemblies 101 may converge within a central portion of the press frame 102, forming a pressurized chamber that may be utilized to form superhard materials such as synthetic diamond or cubic boron nitride. A radial compression element 103 is disposed around an outer diameter of a body 104 of the cartridge assemblies 101; the radial compression element 103 being adapted to limit radial expansion of the cartridge body 104. At least one mechanism 105 is attached to the radial compression element 103. The at least one mechanism 105 is adapted to preload the threaded connection between the cartridge assembly 101 and the frame 102.

The unitary press frame 102 may comprise materials selected from the group consisting of high-strength steel, polymer fibers, graphite fiber composites, or a combination thereof. The unitary frame 102 may also comprise a cubic, prismatic, spherical, or ellipsoidal shape.

Figure 2:
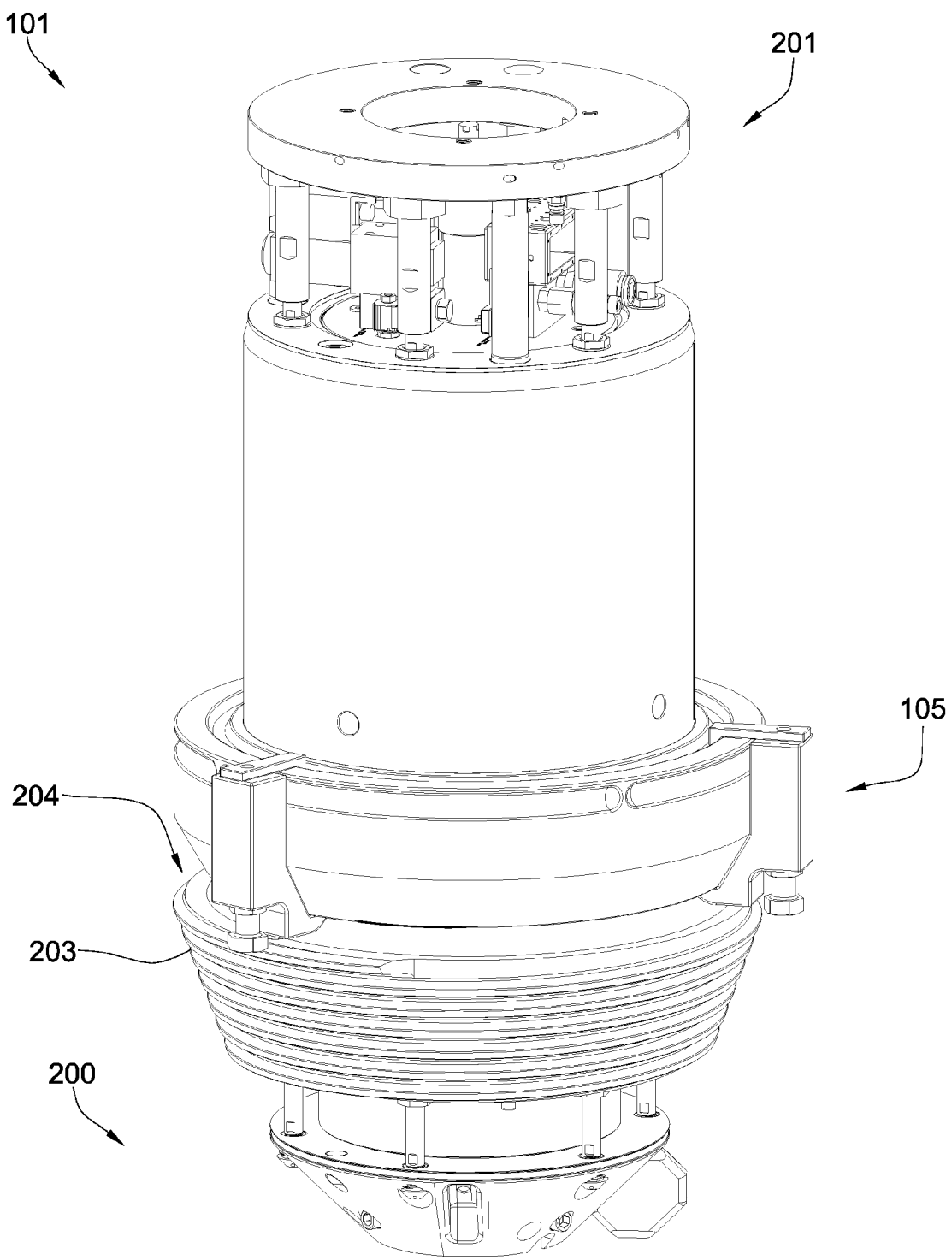
FIG. 2 is a perspective diagram of an embodiment of a cartridge assembly.

Referring now to FIG. 2, the cartridge assembly 101 may comprise a front end 200 and a back end 201. The front end 200 may be in communication with the back end 201 such that the back end 201 applies a force on the front end 200, focused at an anvil (See FIG. 6) at the front end 200. The back end 201 may comprise a means of housing hydraulics and electronic circuitry used to produce the required pressures and temperatures for the production of superhard material in the pressurized chamber of the press. The cartridge assembly 101 may comprise a thread 203 for connecting to the press frame. The thread 203 may be tapered. The assembly 101 may also comprise an undercut portion 204 where the thread 203 begins on the cylindrical body 104, which may allow for structural support near the front end 200 of the assembly 101. U.S. Patent Publication 2007/0040140, which is herein incorporated by reference for all that it contains, discloses a cartridge which may be compatible with the present invention.

To prevent sagging which may cause the threaded connection between the cartridge assembly 101 and the frame to misalign at least one mechanism 105 is attached to the radial compression element 103 to pre-load the threads 203. In the preferred embodiment, a plurality of mechanisms 105 may be evenly attached around the compression element 103. The at least one mechanism is adapted to preload the threaded connection between the cartridge assembly 101 and the frame. In the some embodiments, the at least one mechanism may comprise a clamp in communication with the unitary frame. The clamp may be adjusted according to the degree of sag of the cartridge assembly 101 experiences during operation.

Figure 3:
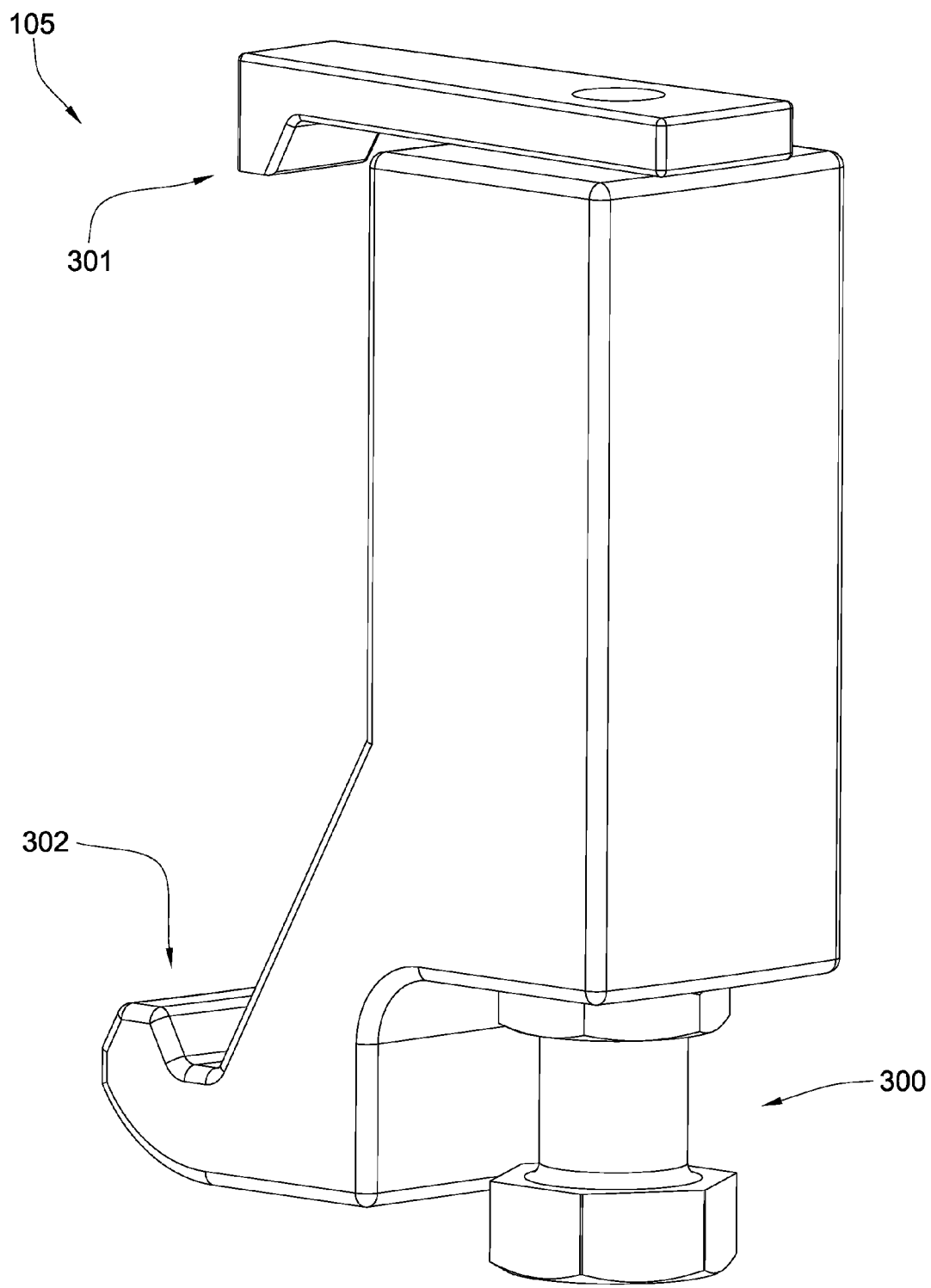
FIG. 3 is a perspective diagram of an embodiment of a preloading mechanism.

FIG. 3 is a perspective diagram of a preloading mechanism 105. In this embodiment, the preloading mechanism 105 may comprise a clamp. The clamp may comprise a first end 301 and a second end 302, the first and second ends 301, 302, being adapted to fit into notches formed in a radial compression element in order to secure the mechanism to the compression element. A working portion 300 of the mechanism may comprise an adjustable thread. The thread may be manually or mechanically adjusted in order to apply the necessary tension for preloading the threaded connection between the anvil and the frame. In other embodiments, the working portion may be controlled hydraulically.

Figures 4, 5:
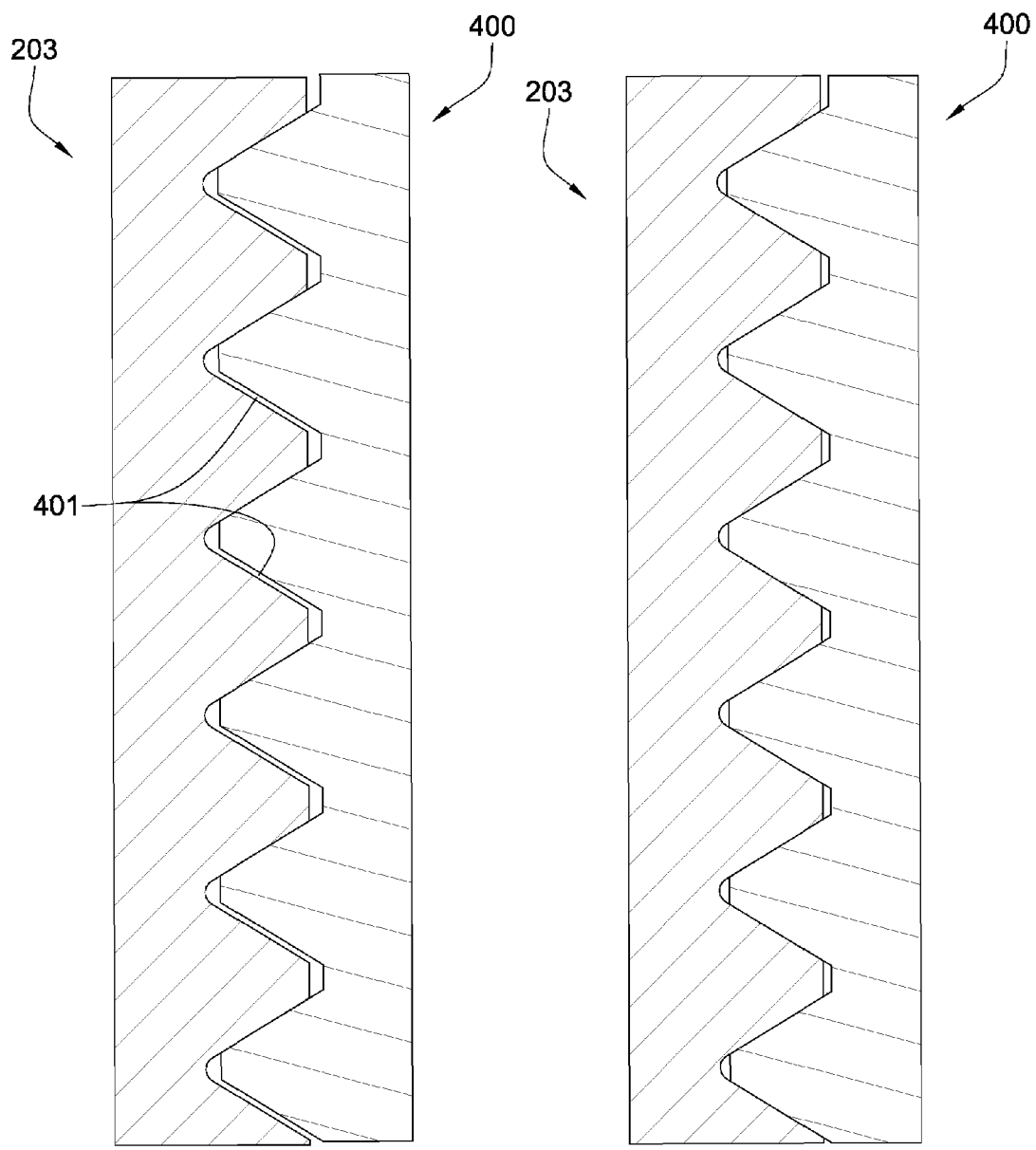
FIG. 4 is a cross-sectional diagram of an embodiment of a threaded connection between a cartridge assembly and a frame.
FIG. 5 is a cross-sectional diagram of another embodiment of a threaded connection between a cartridge assembly and a frame.

FIGS. 4 and 5 illustrate a threaded connection between the cartridge thread 203 and the internal unitary frame thread 400. In the embodiment of FIG. 4, the external and internal threads 203, 400, do not preloaded, forming gaps 401 between the threads 203, 400. It is believed that the gaps results from the gravitational pull on the attached cartridge assembly. This may cause the cartridge assembly to sag, thereby causing the anvils to misalign. It is believed that preloading the threaded connection will compress the internal and external threads together causing the cartridge to realign and thereby realign the avils. FIG. 5 illustrates a preloaded threaded connection between the cartridge thread 203 and the internal unitary frame thread 400. The external and internal threads 203, 400, align so that the cartridge assembly applies an even force, relative to the other cartridge assemblies, to the pressurized chamber of the press.

Figure 6:
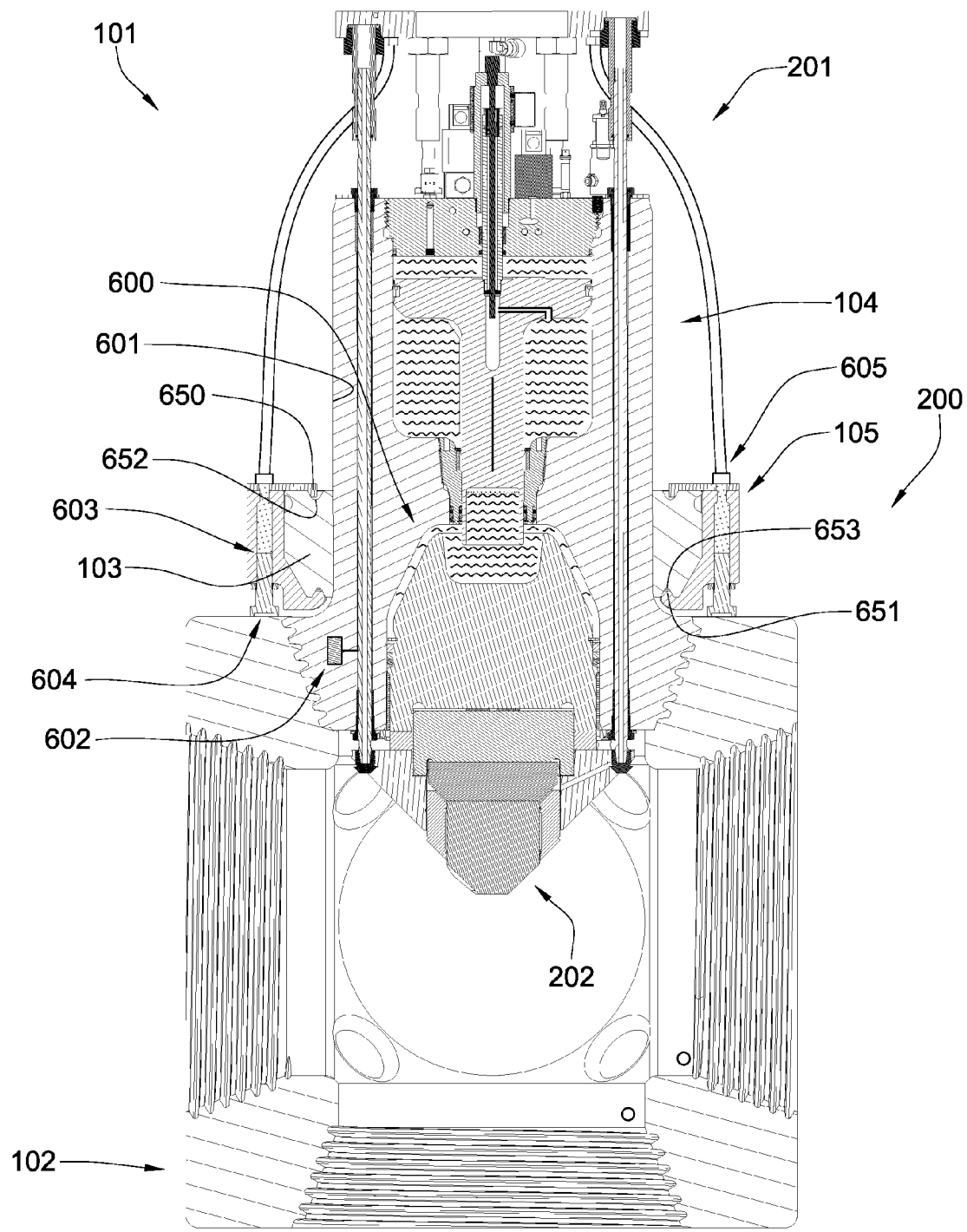
FIG. 6 is a cross-sectional diagram of another embodiment of a cartridge assembly.

FIG. 6 illustrates a cross-sectional diagram of a cartridge assembly 101 being threaded into a threaded borehole in a wall of a unitary frame 102. A hydraulic chamber 600 may be disposed within the body 104; the hydraulic chamber 600 being adapted to apply axial pressure to the anvil 202. A radial compression element 103 is disposed around an outer diameter 601 of the body 104 and is adapted to limit radial expansion of the body 104 proximate the hydraulic chamber 600. In the preferred embodiment, at least one mechanism 105 may be attached to the radial compression element 103. In this embodiment, the mechanism 105 comprises a hydraulic clamp. A first end 301 and a second end 302 of the clamp may be adapted to fit, respectively, within a first notch 652 and a second notch 653 of the compression element 103 so that the clamp is securely fixed to the compression element 103. The mechanism 105 may be adapted to preload the threaded connection between the cartridge assembly 101 and the frame 102. As the external thread 203 and the inner thread of the frame are mated, the threaded connection may not perfectly align, potentially causing the six cartridge assemblies 101 to apply misdirected forces, which would be unsuitable for operation. Thus, preloading the thread before operating the HTHP press may align the threaded connection and prevent the cartridges from applying misdirected forces. The hydraulic clamps may be activated individually or together. Preferably the threads are preloaded before any of the anvils come into contact with the reaction cell placed within the press. In some embodiments, software controls the preloading pressure, the pressurizing time, the depressurizing time and other preloading parameters.

The cartridge assembly 101 may comprise a sensor 602 adapted to sense the amount of preload. In some embodiments, a sensor may be associated each of the preloading mechanism; the sensor being adapted to sense the pressure being applied by each mechanism and thereby send signals to adjust the preload pressure. In this embodiment, the working portion 603 may be disposed within the preloading mechanism 105 and may be hydraulically controlled. In this embodiment, a bronze wafer 604 may be disposed intermediate the working portion 603 and the press frame 102. The bronze wafer 604 may be adapted to protect the surface of the frame 102.

Figure 7:
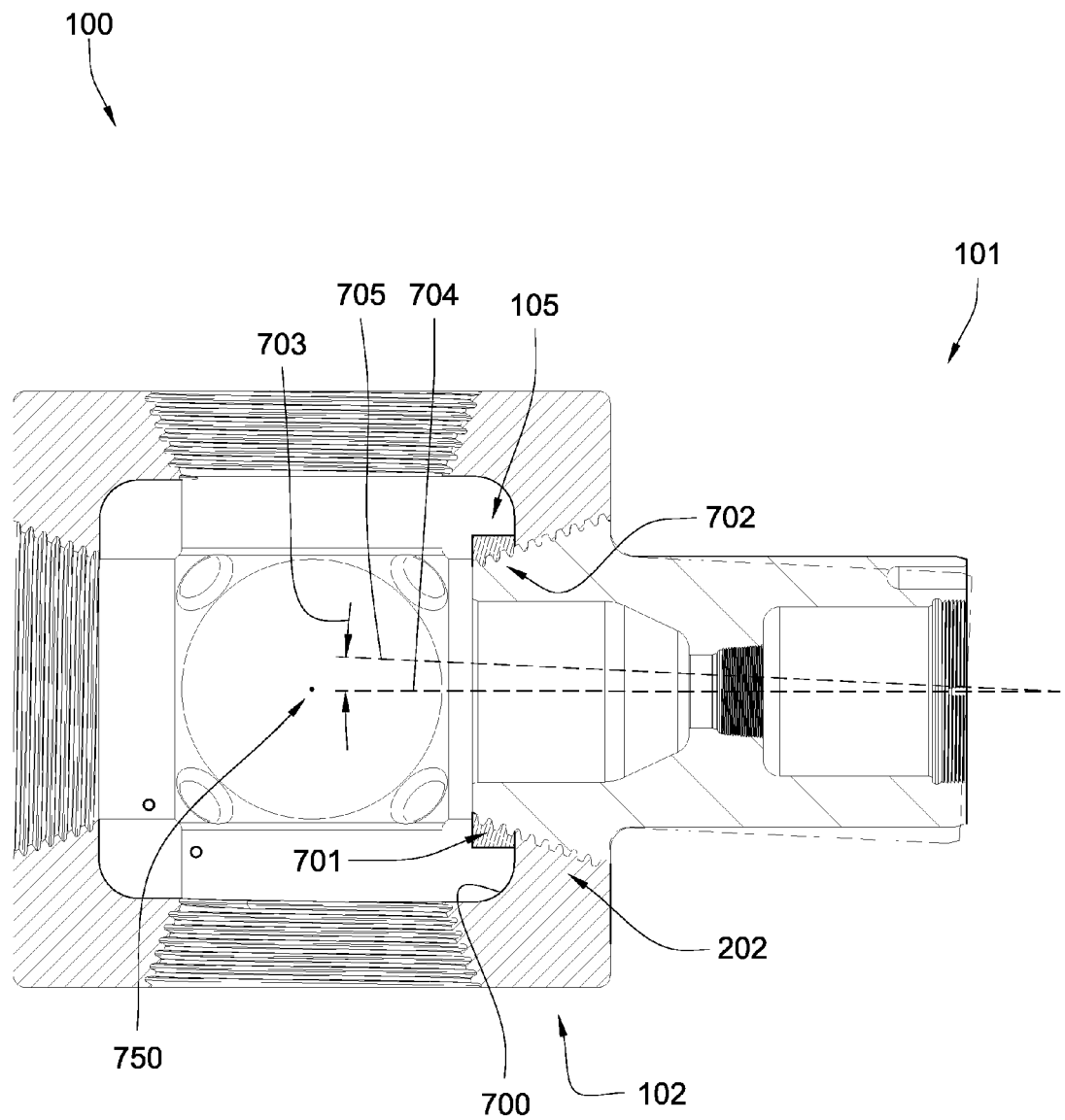
FIG. 7 is a cross-sectional diagram of another embodiment of a cartridge assembly.

Referring now to FIG. 7, the HTHP press apparatus 100 may have a cartridge assembly 101 for connection to a unitary frame 102. In this embodiment, the at least one mechanism 105 comprises a nut disposed at an inner portion 700 of the frame 102. The nut comprises an internal thread 701 adapted to mate with a portion 702 of the threaded anvil 202. The nut may be adapted to apply pressure to the threaded connection, thereby preloading the thread. The degree of sag 703 is determined by the angle between a central axis 704 through the center 750 of the press 100 and an actual axis 705 of the cartridge assembly in the frame. In this embodiment, the preloading mechanism aligns the actual axis with the central axis 704.

Figure 8:
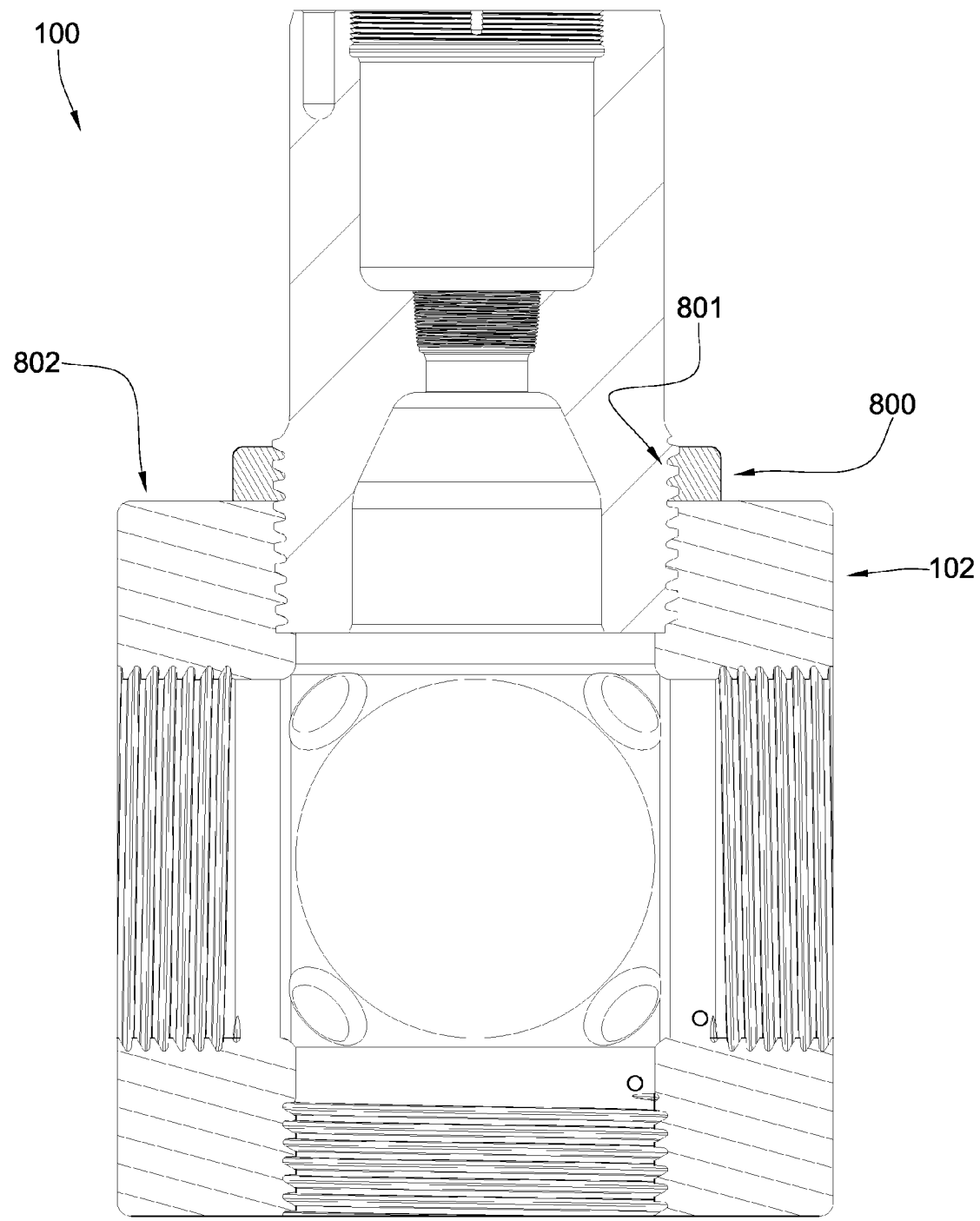
FIG. 8 is a cross-sectional diagram of another embodiment of a cartridge assembly.

FIG. 8 illustrates another embodiment of at least one mechanism 105 in communication with the press apparatus 100. In this embodiment, the mechanism 105 comprises an internally threaded nut that is mated with a portion 801 of the threaded anvil 202; the threaded connection being proximate an outer wall 802 of the frame 102. In other embodiments, a plurality of mechanisms may be disposed within the press apparatus as well as about the press apparatus.

FIG. 9 is a diagram of an embodiment of a method 900 having steps for preloading a thread used in high-temperature, high-pressure processing. The method 900 includes providing 901 a cartridge adapted for connection to a frame of a high-temperature, high-pressure press with an anvil at a front end of the cylindrical body of the cartridge and a hydraulic chamber within the body adapted to apply axial pressure to the anvil. The method 900 also includes securing 902 at least one mechanism to a radial compression element disposed around an outer diameter of the body of the cartridge. The method 900 further includes mating 903 a threaded portion of the cartridge with a threaded inside diameter of a borehole disposed in a wall of the frame. The method 900 lastly includes adjusting 904 the at least one mechanism and thereby preloading the threaded connection between the cartridge assembly and the frame. The step of adjusting the at least one mechanism may include a hydraulically controlled mechanism, a mechanically controlled threaded mechanism, or a combination thereof.

Whereas the present invention has been described in particular relation to the drawings attached hereto, it should be understood that other and further modifications apart from those shown or suggested herein, may be made within the scope and spirit of the present invention.

What is claimed is:

1. A high-temperature, high-pressure press apparatus, comprising:
a cartridge assembly adapted for connection to a unitary frame;
an anvil at a front end of a cylindrical body of the cartridge and a hydraulic chamber within the body adapted to apply axial pressure to the anvil;
a threaded end of the anvil being adapted for mating with a threaded inside diameter of a borehole disposed within a wall of the frame;
a radial compression element disposed around an outer diameter of the body and adapted to limit radial expansion of the body proximate the hydraulic chamber; and
at least one mechanism attached to the radial compression element, the at least one mechanism being adapted to preload the threaded connection between the cartridge assembly and the frame.

2. The apparatus of claim 1, wherein the cartridge assembly comprises a sensor adapted to control a working portion of the at least one mechanism.

3. The apparatus of claim 2, wherein the working portion is hydraulically controlled.

4. The apparatus of claim 2, wherein the working portion comprises an adjustable thread.

5. The apparatus of claim 1, wherein a bronze wafer is disposed intermediate the at least one mechanism and the frame of the press, the bronze wafer being adapted to protect the surface of the frame.

6. The apparatus of claim 1, wherein the unitary frame comprises materials selected from the group consisting of high-strength steel, polymer fibers, graphite fiber composites, or a combination thereof.

7. The apparatus of claim 1, wherein the unitary frame comprises a cubic, prismatic, spherical, or ellipsoidal shape.

8. The apparatus of claim 1, wherein the radial compression element is a solid annular ring.

9. The apparatus of claim 1, wherein the radial compression element comprises a varying thickness in an axial direction.

10. The apparatus of claim 1, wherein the radial compression element comprises an axial length from 4 to 16 inches.

11. The apparatus of claim 1, wherein the radial compression element comprises at least one notch adapted for securing the at least one mechanism to the radial compression element.

12. The apparatus of claim 1, wherein the at least one mechanism is in communication with an undercut portion of the anvil.

13. A method for preloading a thread used in high-temperature, high-pressure processing, comprising steps of:
providing a cartridge adapted for connection to a frame of a high-temperature, high-pressure press with an anvil at a front end of a cylindrical body of the cartridge and a hydraulic chamber within the body adapted to apply axial pressure to the anvil;
providing a radial compression element disposed around an outer diameter of the body and adapted to limit radial expansion of the body proximate the hydraulic chamber;
securing at least one mechanism to the radial compression element;
mating a threaded portion of the anvil with a threaded inside diameter of a borehole disposed in a wall of the frame;
adjusting the at least one mechanism and thereby preloading the threaded connection between the cartridge assembly and the frame.

14. The method of claim 13, wherein the least one mechanism is adjusted hydraulically.

15. The method of claim 13, wherein the at least one mechanism is adjusted by controlling an inner threaded working portion.

16. A high-temperature, high-pressure press apparatus, comprising:
a cartridge assembly for connection to a unitary frame;
an anvil at a front end of a cylindrical body of the cartridge and a hydraulic chamber within the body adapted to apply axial pressure to the anvil;
a threaded end of the anvil being adapted for mating with a threaded inside diameter of a borehole disposed within a wall of the frame;
at least one mechanism in communication with the press apparatus, the at least one mechanism being adapted to preload the threaded connection between the cartridge assembly and the frame.

17. The apparatus of claim 16, wherein the at least one mechanism comprises a threaded nut in communication with the press apparatus.

18. The apparatus of claim 16, wherein the at least one mechanism comprises a hydraulic working portion.

* * * * *